United States Patent [19]

Leo et al.

[11] Patent Number: 5,369,469

[45] Date of Patent: Nov. 29, 1994

[54] VOICE OF THE CUSTOMER ACQUISTION SYSTEM

[75] Inventors: Richard J. Leo, Rochester; David C. Bliek, Webster, both of N.Y.; Vincent P. Vaccarelli, Thousand Oaks, Calif.

[73] Assignee: Xerox Corporation, Stamford, Conn.

[21] Appl. No.: 88,019

[22] Filed: Jul. 9, 1993

[51] Int. Cl.5 .......................................... G03G 15/00
[52] U.S. Cl. ........................... 355/202; 358/296; 379/100; 395/114
[58] Field of Search ............... 355/200, 202, 204; 395/114; 358/434, 296, 406; 379/100, 90, 92; 371/16.4

[56] References Cited

U.S. PATENT DOCUMENTS

| | | | |
|---|---|---|---|
| 3,882,305 | 5/1975 | Johnstone | 235/151.11 |
| 4,186,299 | 1/1980 | Batchelor | 235/304.1 |
| 4,464,044 | 8/1984 | Matsuyama | 355/14 R |
| 4,478,509 | 10/1984 | Daughton et al. | 355/14 |
| 4,536,079 | 8/1985 | Lippolis et al. | 355/14 R |
| 4,639,918 | 1/1987 | Linkowski | 371/20 |
| 5,057,866 | 10/1991 | Hill, Jr. et al. | 355/200 |
| 5,187,591 | 2/1993 | Gay et al. | 358/434 |
| 5,216,461 | 6/1993 | Maekawa et al. | 355/202 |
| 5,289,532 | 2/1994 | Ishikawa et al. | 379/100 |

FOREIGN PATENT DOCUMENTS

4-184368  7/1992  Japan ................................. 355/206

Primary Examiner—Joan H. Pendegrass
Attorney, Agent, or Firm—John S. Wagley

[57] ABSTRACT

A method of receiving and processing verbal input from a user of a printing machine having at least, a voice input activator, a voice receiver, an output signal connected to a communications medium, and an output receiving station remote from the machine is provided. The method includes the steps of: energizing the input activator, speaking into the voice receiver, receiving the verbal input at the machine, converting the verbal input to a transmittable signal, automatically connecting and transmitting the transmittable signal to the communications medium upon energizing the input activator, receiving the signal at the remote station, processing the information received at the remote station, and deenergizing the input activator.

21 Claims, 8 Drawing Sheets

VOICE OF THE CUSTOMER ACQUISTION SYSTEM

The present invention relates to a method of acquiring spontaneous unsolicited customer input. More specifically, the invention relates to a method of acquiring customer input from an electrophotographic printer user or customer.

In the well-known process of electrophotographic printing, a charge retentive surface, typically known as a photoreceptor, is electrostatically charged, and then exposed to a light pattern of an original image to selectively discharge the surface in accordance therewith. The resulting pattern of charged and discharged areas on the photoreceptor form an electrostatic charge pattern, known as a latent image, conforming to the original image. The latent image is developed by contacting it with a finely divided electrostatically attractable powder known as "toner." Toner is held on the image areas by the electrostatic charge on the photoreceptor surface. Thus, a toner image is produced in conformity with a light image of the original being reproduced. The toner image may then be transferred to a substrate or support member (e.g., paper), and the image affixed thereto to form a permanent record of the image to be reproduced. Subsequent to development, excess toner left on the charge retentive surface is cleaned from the surface. The process is useful for light lens copying from an original or printing electronically generated or stored originals such as with a raster output scanner (ROS), where a charged surface may be imagewise discharged in a variety of ways.

In today's world class market driven industries, it is essential that an unadulterated customer input referred to as the "voice of the customer" be obtained so that products can be refined to best meet the customer's needs. (see Eureka, William E., and Nancy E. Ryan, *The Customer-Driven Company*, Dearborn, Mich.: ASI Press, 1988).

Corporate marketing departments and market research firms attempt to obtain the voice of the customer by surveys and through the use of toll free customer service numbers. The effort of finding a telephone, dialing the number and getting through to the representative often diffuses the energy of the customer's initial feelings and masks the customer's true feelings at the moment of frustration or delight.

The following disclosures may be relevant to various aspects of the present invention:

U.S. Pat. No. 4,186,299
  Patentee: Batchelor
  Issue Date: Jan. 29, 1980
U.S. Pat. No. 4,464,044
  Patentee: Matsuyama
  Issue Date: Aug. 7, 1984
U.S. Pat. No. 4,536,079
  Patentee: Lippolis et al.
  Issue Date: Aug. 20, 1985
U.S. Pat. No. 4,478,509
  Patentee: Daughton et al.
  Issue Date: Oct. 23, 1984
U.S. Pat. No. 4,639,918
  Patentee: Linkowski
  Issue Date: Jan. 27, 1987
U.S. Pat. No. 3,882,305
  Patentee: Johnstone
  Issue Date: May 6, 1975
U.S. Pat . No. 5,057,866
  Patentee: Hill, Jr. et al.
  Issue Date: Oct. 15, 1991

The relevant portions of the foregoing disclosures may be briefly summarized as follows:

In the prior art, there are numerous instances in which keypads are exploited for various purposes relating to interfacing with the customer.

U.S. Pat. No. 4,186,299 to Batchelor, assigned to Xerox Corporation, and U.S. Pat . No. 4,464,044 to Matsuyama disclose copying machines having keyboards primarily for directing normal copying operations. The keypads also serve the additional function of initiating diagnostic routines.

U.S. Pat. No. 4,536,079 to Lippolis et al. discloses a copying machine keyboard that is usable by a service agent to change a timing parameter for diagnostic and repair purposes.

U.S. Pat. No. 4,478,509 to Daughton et al, assigned to Xerox Corporation, discloses a control console which can be used to direct copy or other runs.

U.S. Pat. No. 4,639,918 to Linkowski discloses a calculator keyboard that is used to control diagnostic functions of a mailing machine. During regular operation the same keyboard is used to control the normal function of the machine.

U.S. Pat. No. 3,882,305 to Johnstone discloses a diagnostic communication system for machine tools which interlinks a machine tool with diagnostic and analysis equipment located remote from the machine.

U.S. Pat. No. 5,057,866 to Hill, Jr. et al., assigned to Xerox Corporation, discloses a technique for monitoring machine status conditions in a copying machine and initiating a communication with a remote computer.

According to the present invention a method of receiving and processing verbal input from a user of a printing machine having at least, a voice input activator, a voice receiver, an output signal connected to a communications medium, and an output receiving station remote from the machine is provided. The method includes the steps of: energizing the input activator, speaking into the voice receiver, receiving the verbal input at the machine, converting the verbal input to a transmittable signal, automatically connecting and transmitting the transmittable signal to the communications medium upon energizing the input activator, receiving the signal at the remote station, processing the information received at the remote station, and deenergizing the input activator.

Also, according to the present invention, a method of receiving and processing verbal input from a user coincidental with monitoring the status conditions of a printing machine in a printing system is provided. The system includes a host computer, while the printing machine has at least a controller, a calculator, a voice input activator, a voice receiver, and an output receiving station remote from the printing machine. The calculator monitors predetermined status conditions of the printing machine, including the steps of: energizing the input activator, speaking into the voice receiver, monitoring with the calculator the status conditions of the machine, receiving the verbal input and the status conditions of the machine at the machine, converting the verbal input and the status conditions of the machine to a transmittable signal, automatically connecting and transmitting the transmittable signal to the communications medium upon energizing the input activator, receiving the signal at the remote station, processing the information received at the remote station, and deenergizing the input activator.

Also, according to the present invention, a printing system includes a printing machine, with a plurality of processing stations, a host computer located remotely from the printing machine, and a receiving station. The printing system has a detector for detecting the status of one of the processing stations of the printing machine and transmitting a status signal indicating the status to the host computer. The printing system also includes an operator actuatable member, associated with the printing machine, for transmitting voice information relating to the status of the printing machine to the receiving station. The member is used in conjunction with the detector for transmitting the status signal.

This invention may be incorporated into any multicomponent machine with which an operator interacts. For example, referring first to FIG. 1, a photocopy machine or printer 10 includes an operator's control panel 12 from which an operator may control the functioning of the machine 10. It should be appreciated that the invention may be practiced regardless of the type or complexity of the machine 10. A switch 14, such as a push button or a portion of a touch screen is located within the operator control panel 12 and is used to energize a microphone 16. The push button 14 and the microphone 16 are electrically connected to a transmitting terminal 20 from which a signal 22 may be transported across a communication line 24. The signal 22 is received via the communication line 24 to a receiving terminal 26 located at a remote location 30. The signal 22 is transmitted from the receiving terminal 26 to a voice recording device 32, such as a voice recorder.

Figure 1:
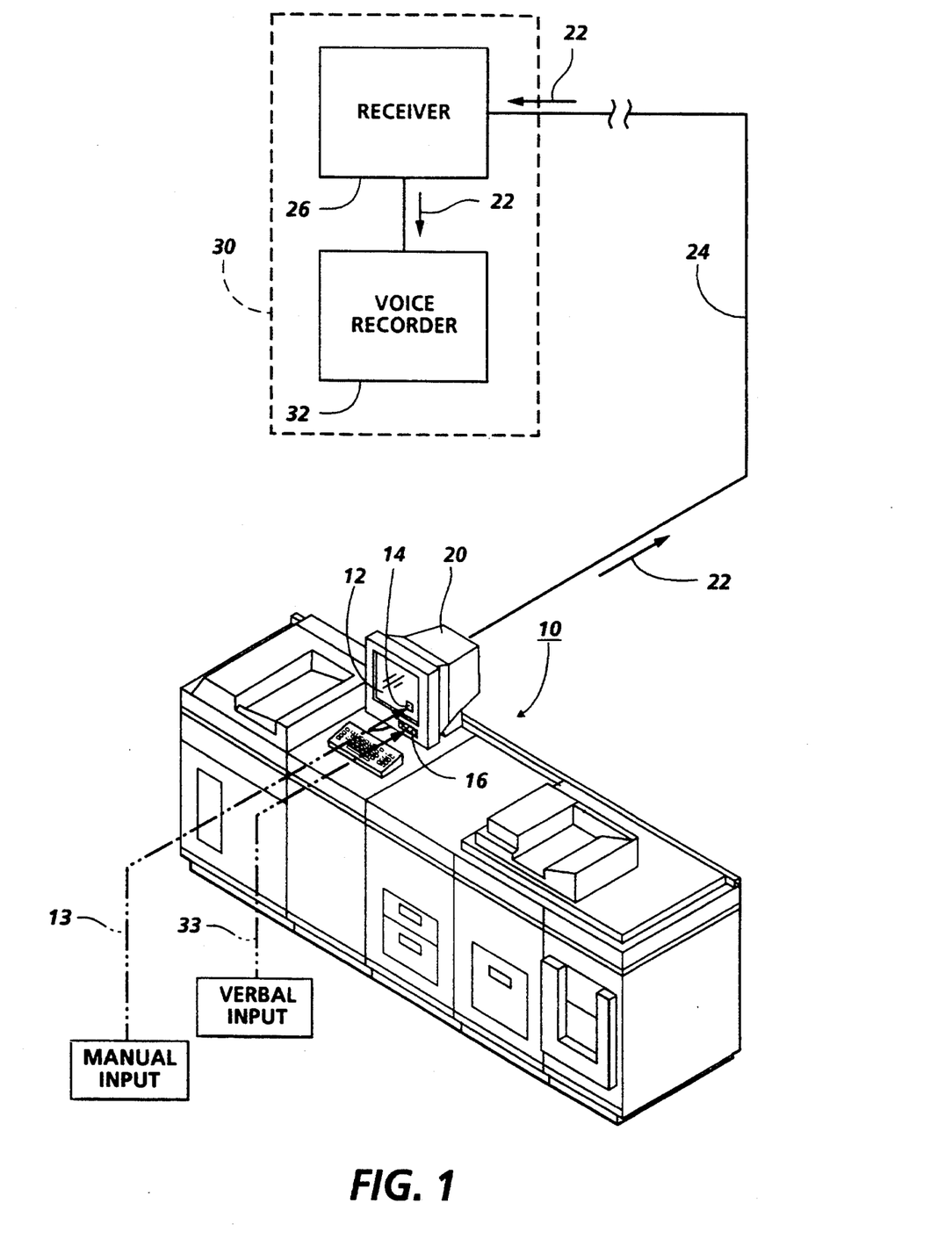
FIG. 1 is a schematic, perspective view of a voice receiving system utilizing a voice receiver at the machine and a cassette type voice recorder remote from the machine according to the present invention.

When the operator 13 experiences a problem with the machine 10 or has a suggestion for its improvement, the operator 13 merely pushes the push button 14 and transcribes an operator's message 33 into the microphone 16. The microphone 16 translates the message 33 into the signal 22, which progresses through the communication line 24 to a remote location 30. The signal 22 vis-a-vis the operator's message 33 is then recorded in the voice recorder 32 from which the operator's recorded comments may be later recovered and/or processed for further actions and/or surveys by appropriate groups such as the customer service organization.

Figure 2:
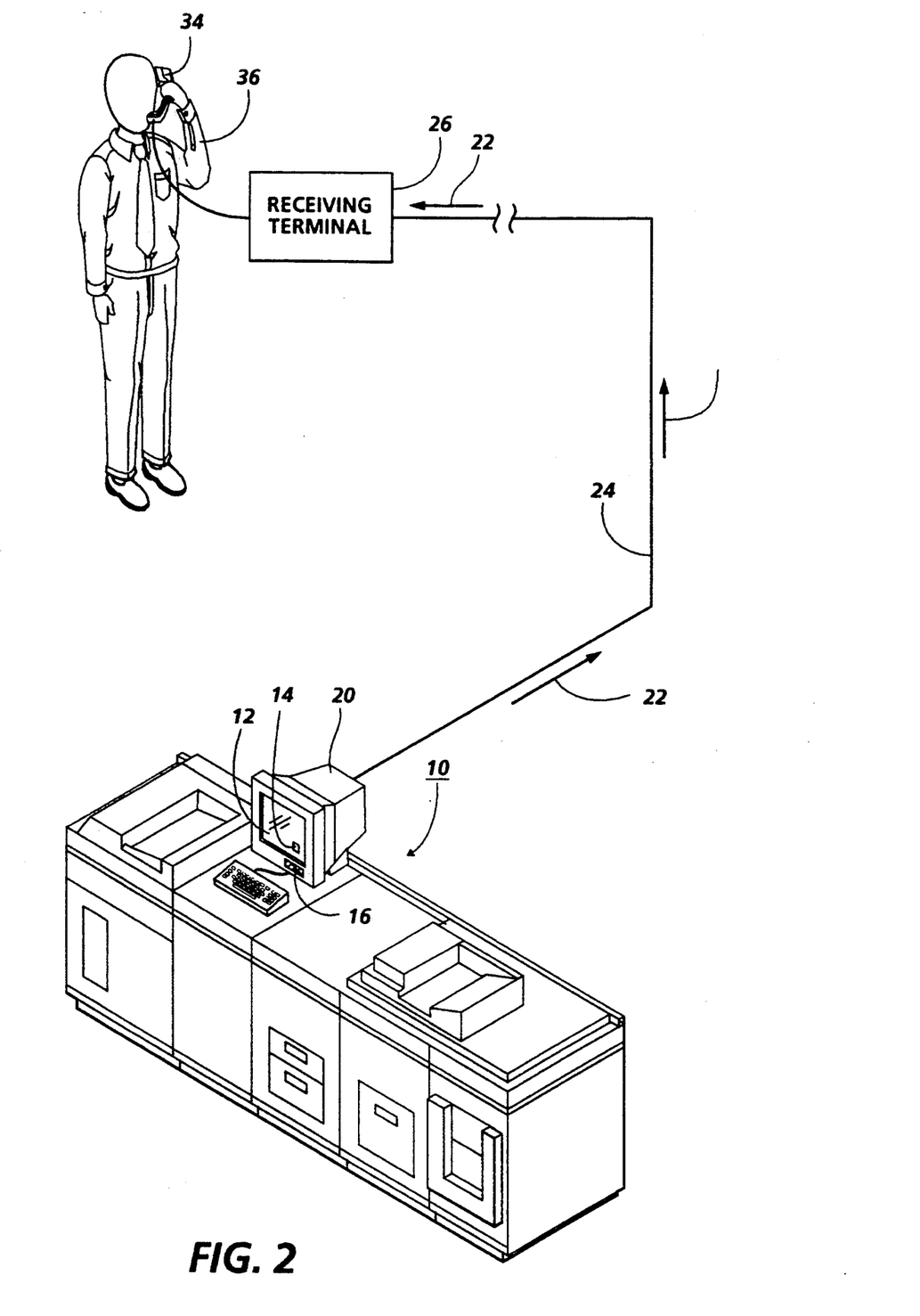
FIG. 2 is a schematic, perspective view of a voice receiving system utilizing a voice receiver at the machine and a live operator remote from the machine according to the present invention.

Referring to FIG. 2, the photocopy machine 10 may likewise be connected by the communication line 24 so that the signal 22 is received by the receiving terminal 26 which is connected to a communication receiving device such as a telephone 34 to which a telephone operator 36 answers and/or records the message 33 received. Similarly as in the arrangement in FIG. 1, the copy machine operator 13, upon experiencing a problem or having a comment, pushes the push button 14 and transcribes a message 33 into the microphone 16. The microphone 16 converts the message 33 into the signal 22 which is sent from the transmitting terminal 20 to the receiving terminal 26 at the remote location 30. The operator 36 then answers the telephone 34 which is connected to the receiving terminal 26. The telephone 34 then reconverts the signal 22 into the message 33 which the operator 36 manually records.

Figure 3A:
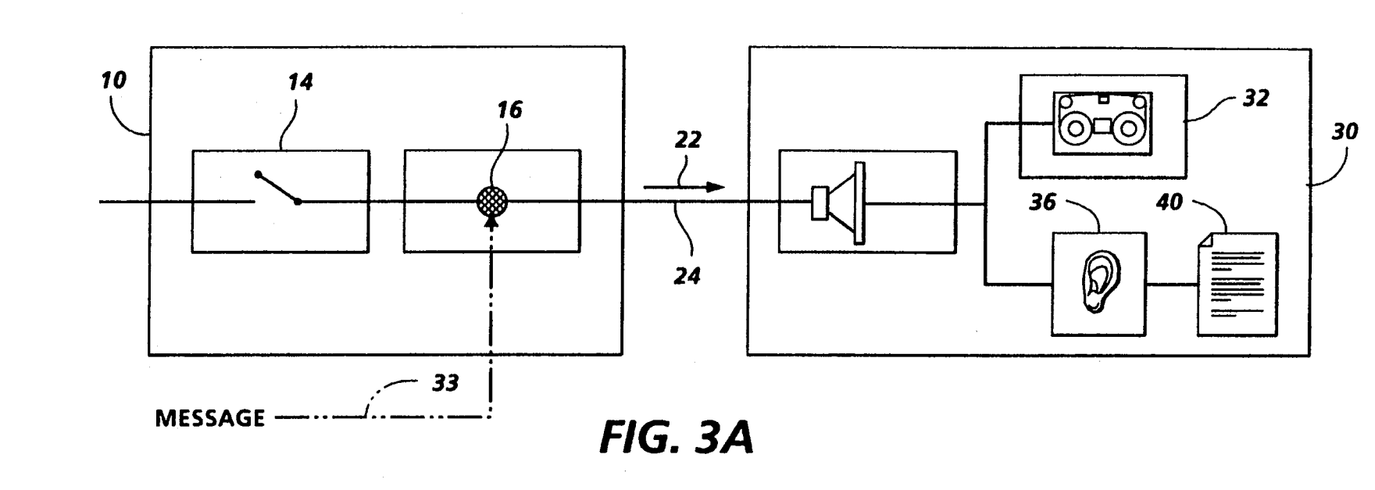
FIG. 3A is a schematic diagram depicting the voice receiving system for the system described in FIGS. 1 and 2.

Now referring to FIG. 3A, the photocopy operator 13 may push the button 14 and speak into the microphone 16 at the machine 10. The signal 22 can be communicated through the communication line 24 to a remote location 30 at which the signal 22 vis-a-vis the operator's message 33 may be recorded on the voice recorder 32 or manually received by the operator 36 and transcribed into a document 40.

Figure 4:
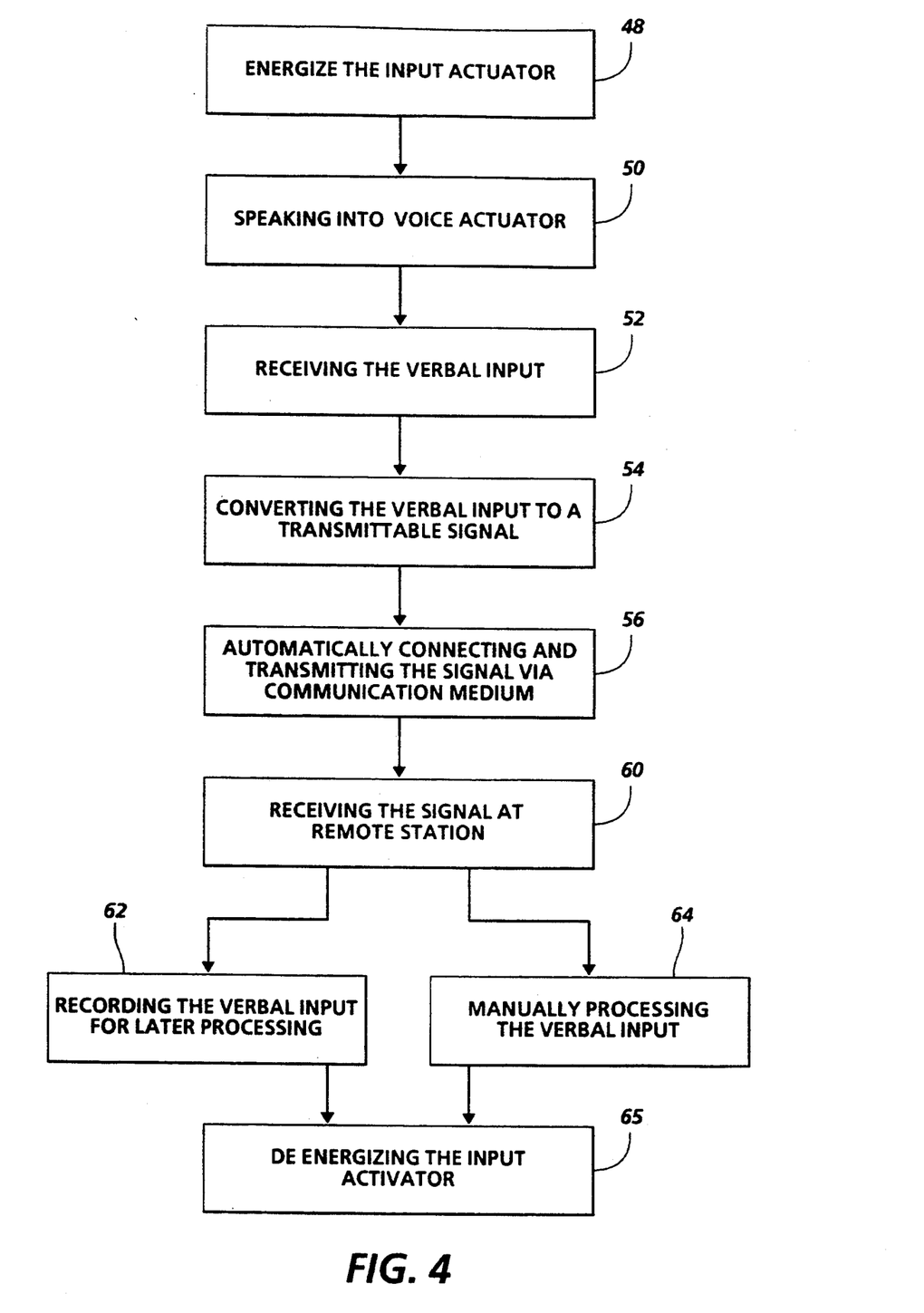
FIG. 4 is a block diagram depicting the voice receiving system for the machine described in FIG. 3A.

Now referring to FIGS. 3A and 4, the operator 13 merely energizes the push button or input activator 14, as illustrated at block 48, and speaks into the microphone 16, as illustrated at block 50. The operator's message or verbal input is received by the microphone 16 at the machine 10, as illustrated at block 52, and the message 33 is converted to the transmittable signal 22, as illustrated at block 54. The signal 22 is automatically connected to the remote location 30 and transmitted across a communication line 24, as illustrated at block 56, preferably by the methods disclosed in U.S. Pat. No. 5,057,866 to Hill, Jr. et al. but it should be appreciated that any known data transmitting method may be used. The signal 22 is then received at the remote location 30, as illustrated at block 60. Once received, the signal 22 may be recorded for later processing, as illustrated at block 62, or may be manually processed, as illustrated at block 64. The operator 13 then merely deenergizes the push button or input activator 14, as illustrated at block 65.

Figure 3B:
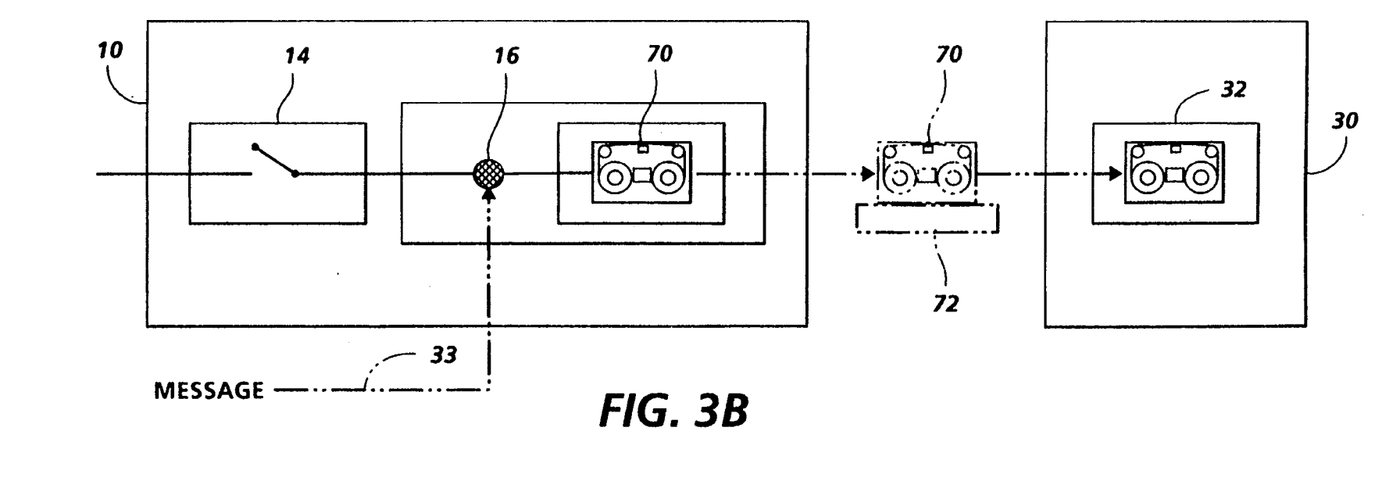
FIG. 3B is a schematic diagram depicting an alternative voice receiving system to the system described in FIGS. 1 and 2.

In an alternate embodiment of this invention, as shown in FIG. 3B, the photocopy machine 10, as previously discussed, similarly includes the push button 14 and the microphone 16 within the operator's panel 12. In this embodiment, the microphone 16 is connected to a first cassette recorder 66 located internally within or externally outside the photocopy machine 10 and the first cassette recorder 42 includes a removable cassette tape 70. The tape 70 is transported via a transporter 72 such as a field service technician or other office personnel to the remote location 30. As in the embodiment shown in FIG. 3A, the remote location 30 includes the voice recorder 32.

Figure 5:
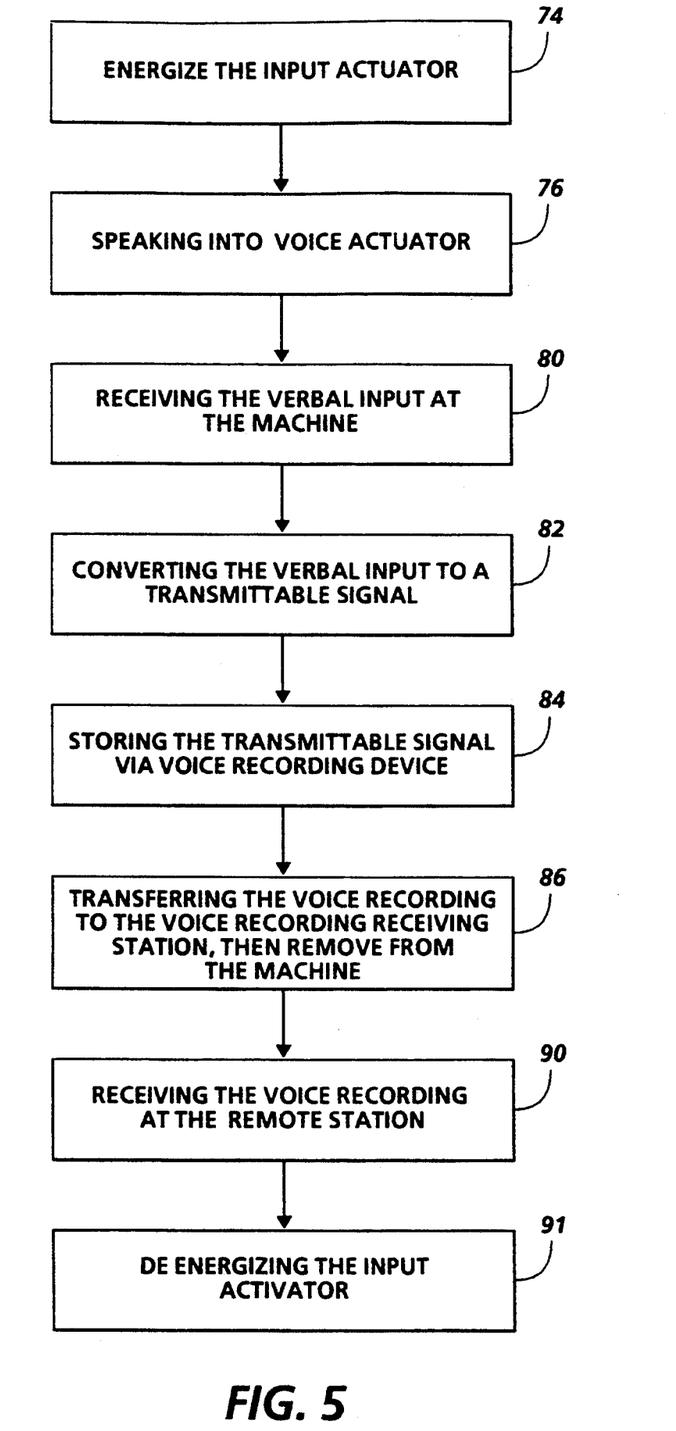
FIG. 5 is a block diagram depicting the voice receiving system for the machine described in FIG. 3B.

Now referring to FIGS. 3B and 5, when the operator 13 has a complaint or suggestion regarding the operation of the machine 10, the operation pushes the push button or input activator 14, as illustrated at block 74, and speaks into microphone or voice actuator 16, as illustrated at block 76, which is electrically connected to the cassette recorder 42. The cassette recorder 42 receives the operators message or verbal input, as illustrated at block 80, and records it onto the cassette tape 44, converting the message into a transmittable signal, as illustrated at block 82. The cassette tape 44 stores the transmittable signal, as illustrated at block 84. The tape 70 is transported via a transporter 72 such as a field service technician or other office personnel to the remote location 30, as illustrated at block 86. There the recording 44 is received by the voice recorder 32, as illustrated at block 90, from which the operator's comments or complaints are received by the remote operator 36 or processed by other communication equipment (not shown). The operator 13 then merely deenergizes the push button or input activator 14, as illustrated at block 91.

The subject invention may also be incorporated into a machine which employs remote interactive communications (R.I.C.) as described in U.S. Pat. No. 5,057,866 to Hill, Jr. et al., and assigned to the assignee of this application.

Figure 6:
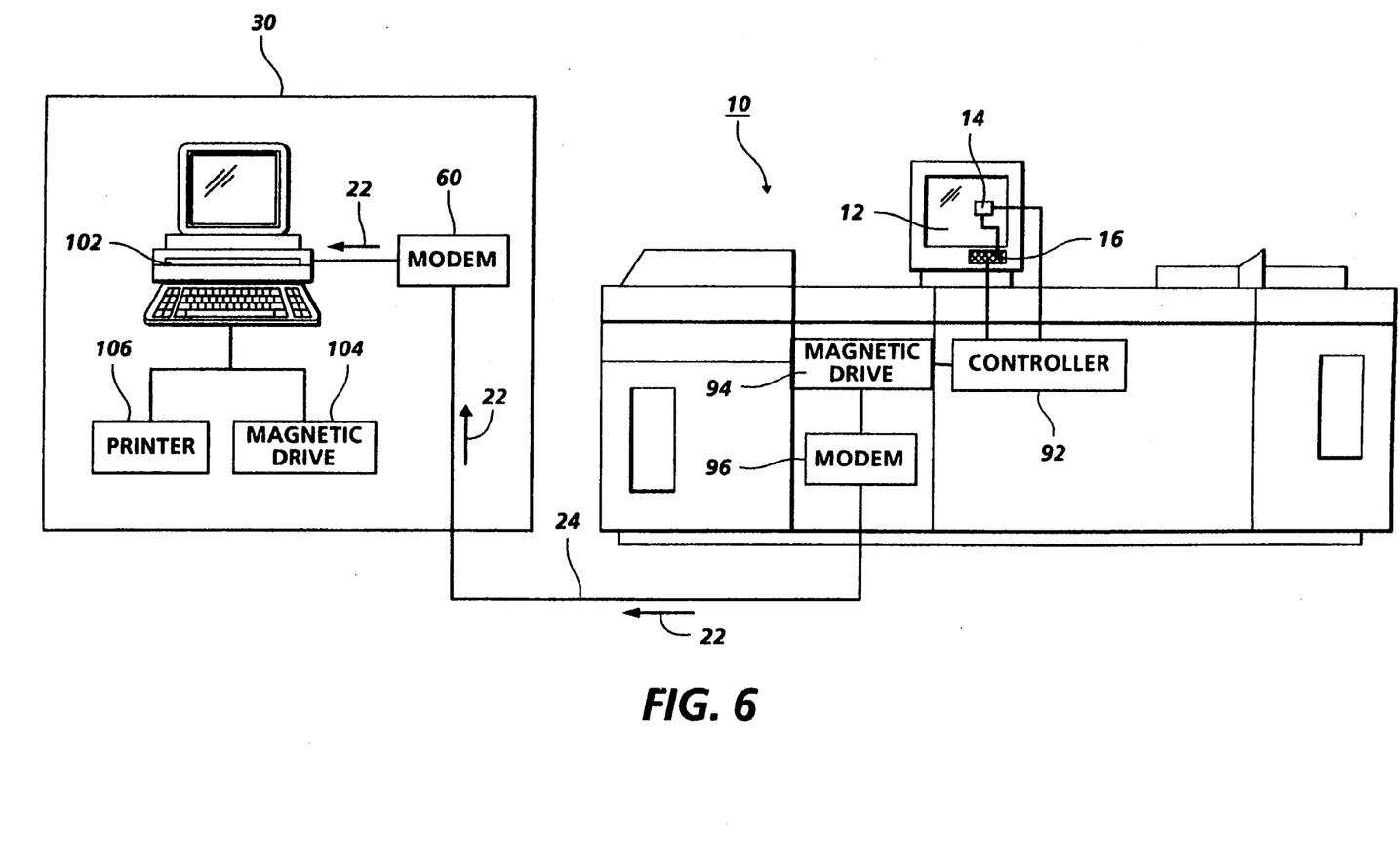
FIG. 6 is an elevation view of a voice receiving system depicting a machine having an internal computer interconnected by modem with a remote host computer according to the present invention.

Referring to FIG. 6, the copy machine 10 is shown utilizing the R.I.C. system. The machine 10 includes the push button 14 and the microphone 16 located in the panel 12 as described earlier. The push button 14 and microphone 16 are electrically connected to a controller 92 which controls the operation of the copy machine 10. The controller 92 is electrically connected to a data storage device 94 such as a magnetic drive. The controller 92 is also electrically connected to a data transmitting/receiving device 96 such as a machine modem from which the communication line 24 extends. The communication line 24 is connected to the remote location 30. A remote modem 100 is located at the remote location 30 and is connected to the communication line 24. The remote modem 100 is electrically connected to a host computer 102 which receives the signal 22 from the communication line 24. The computer 102 is also electrically connected to a computerized file history storage device 104 such as a magnetic drive and is also electrically connected to a printing device 106. The host computer 102 controls the interactions of the remote modem 100, the printer 106 and the file history storage device 104.

Figure 7:
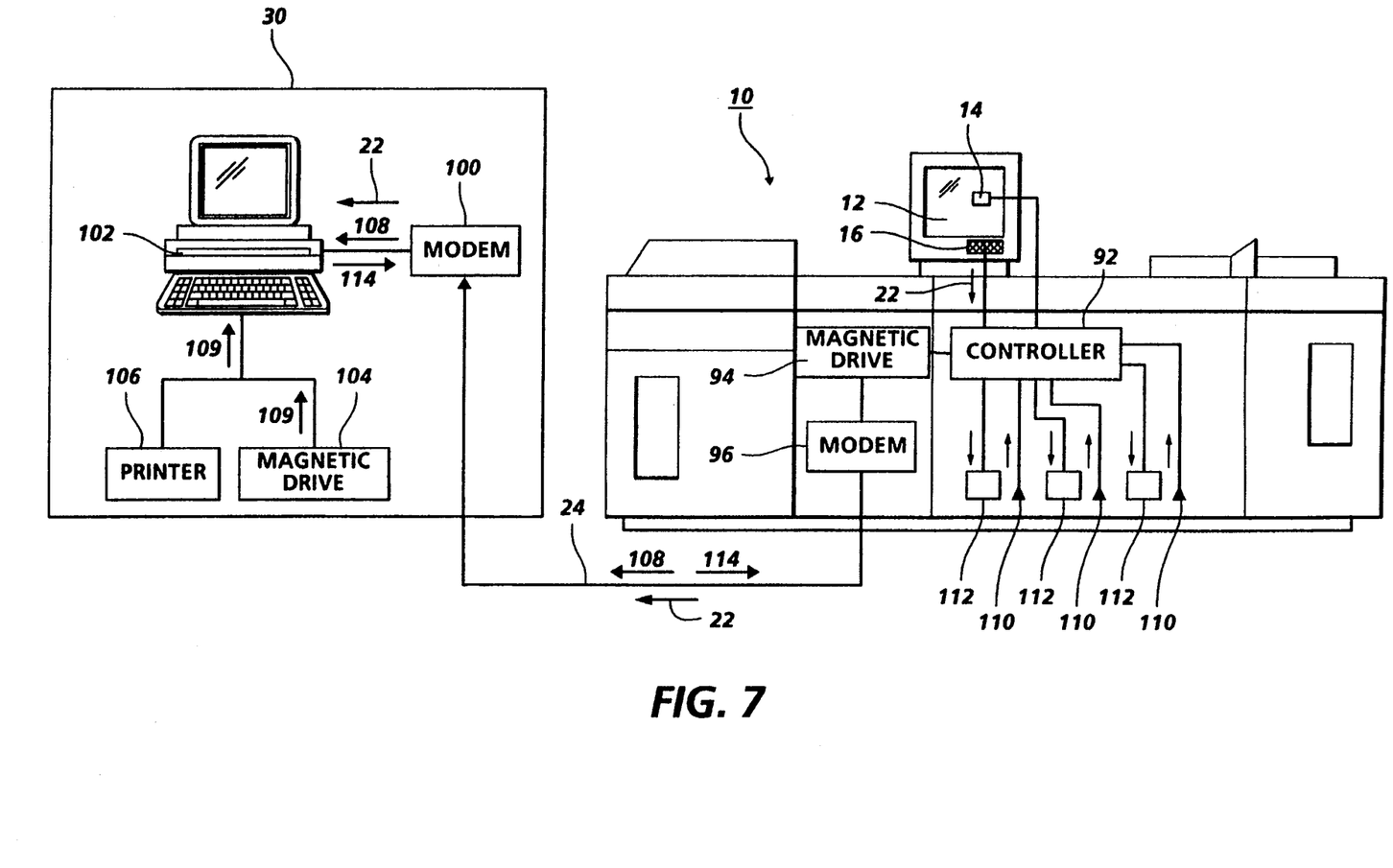
FIG. 7 is an elevation view of a voice receiving system depicting a machine having an internal computer connected to machine sensors and variable controls, the machine being interconnected by modem with a remote host computer according to the present invention.

Now referring to FIG. 9, the remote interactive communication system, (R.I.C. system) may be further utilized to receive sensor output signals 108 representing sensed operating conditions of the machine 10 and report these conditions to the remote location 30, as well as to receive desired signals 109 representing desired operating conditions from the remote location and make corresponding adjustments to the machine. This machine similarly includes the push button 14 and the microphone 16 located in the control panel 12. The controller 92 is connected to the data storage device 94 as well as to the machine modem 96. In addition, the controller 92 is also electrically interconnected to sensors 110 for monitoring certain machine operating conditions and transmitting the appropriate sensor output signal 108 and machine adjusting devices such as servos 112. The machine modem 96 is connected by a communication line 24 to the remote modem 100 located at the remote location 30. The host computer 102 is electrically interconnected to and controls the printer 106, the computerized file history 104, and the remote modem 100.

When the operator 13 wishes to make a complaint or offer a suggestion, the operator 13 pushes the push button 14 and speaks into the microphone 16. The electrical signal 22 is transferred to the controller 92, which may store this information in the data storage area 94, as well as transfer this information via the machine modem 96 through the communication line 24 to the remote station 30. The sensors 110 measure various machine operating conditions and send sensor output signals 108 to the controller 92. These output signals 108 are transmitted via the modem 96 and through the communication line 24 to the remote location 30. These output signals 108 can then be compared to the operator's comments received via signal 22 and used to validate and quantify the comments. The operator's comments via the signal 22 and the sensor output signal 108 are received by the receiving modem 100 and transferred to the host computer 102 which processes this information. This information is then delivered to the data storage device 104 to become part of the computerized file history and may be printed by the printer 106. The operator's message 33 in conjunction with the sensor output signals 108 may be processed by the host computer 102 and compared with the file history in the data storage device 104. Logic (not shown) within the host computer 102 may recommend changes to the machine adjusting devices or servos 112 and the computer 62 may send a servo signal 114 to the machine 10. The servo signal 84 is sent via the modems 100 and 96, as well as the communication line 24, to the controller 92. The servo signal 114 is used to adjust the servos 112 to make the appropriate corrections to the machine 10.

Figure 8:
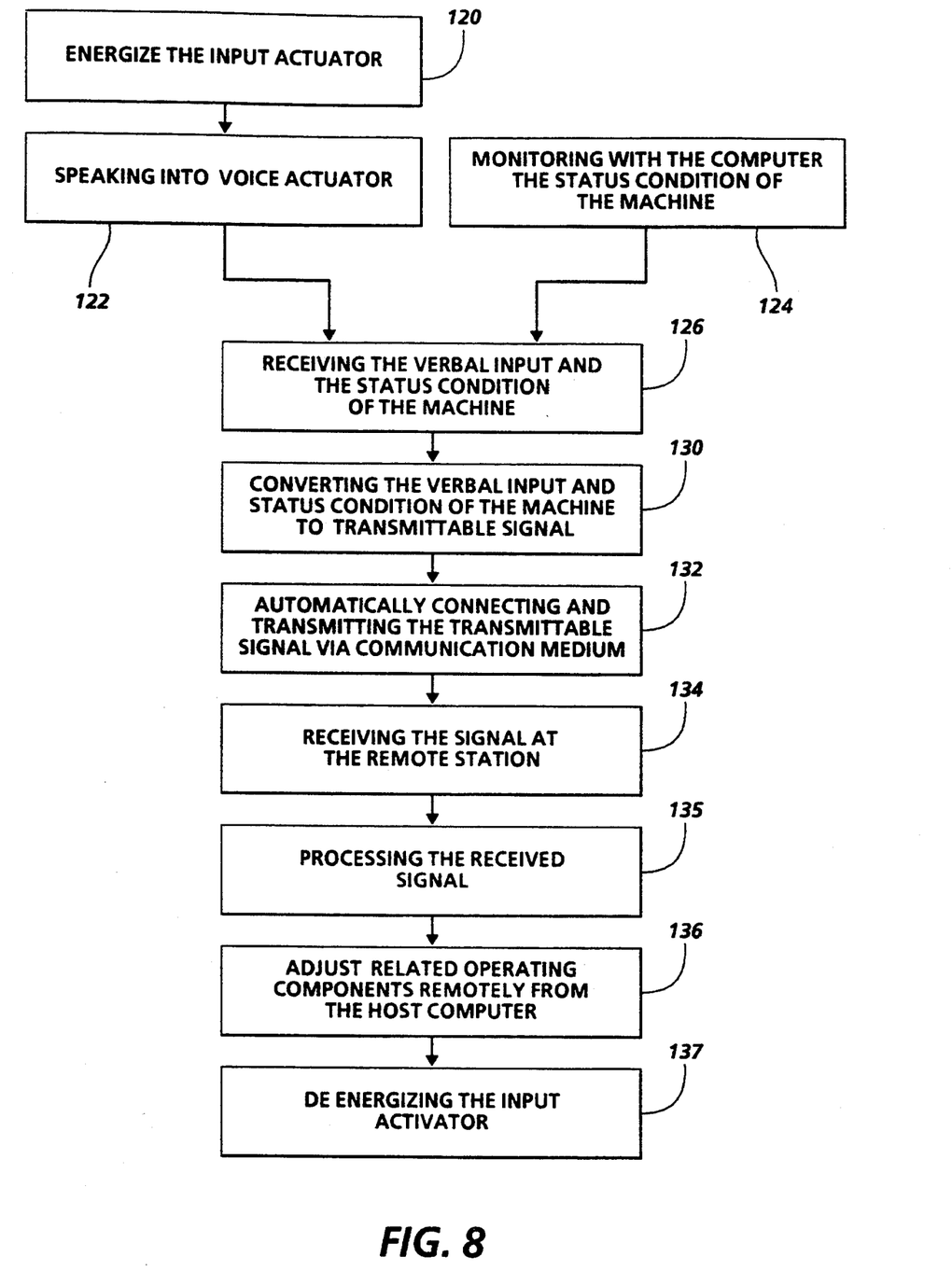
FIG. 8 is a block diagram depicting the voice receiving system for the machines described in FIGS. 6 and 7.

Now referring to FIGS. 6, 7 and 8, the operator first presses the button or input activator 12, as illustrated at block 120, on the machine 10 and speaks into the microphone or voice actuator 16, as illustrated at block 122. The controller or calculator 102, if so incorporated into the machine, monitors the status conditions of the machine 10 by receiving information from the sensors 110 located within the machine 10, as illustrated at block 124. The operator's message 33 is converted into the operator's signal 22, while the sensors 110 convert certain machine operating conditions into sensor output signals 108. The operator's signal 22 and the sensor output signals 108 are received at the controller 92, as illustrated at block 126. The signals 22 and 108 are then forwarded to the machine modem 96, where they are converted into a transmittable signal, as illustrated at block 130. The electrical signal 22 and the sensor output signals 108, if the machine is so equipped, is automatically connected to and sent via the communication line 24, as illustrated at block 132, and received at the host computer 102 located at the remote location 30, as illustrated at block 134. If the machine includes sensors 110, the receiving modem 100 sends the signal 114 from the computer 102 to the communication line 24. Communication line 24 receives the signal 114 and transfer the information to the controller 92. The controller 92 processes this information, as illustrated at block 135, and sends this information to the servo motors 112 which selectably adjusts the operating conditions on the machine 10, as illustrated at block 136. The operator 13 then merely deenergizes the push button or input activator 14, as illustrated at block 137.

While the present invention has been described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

We claim:

1. A method of receiving and processing a message in the form of verbal input from a user of a printing machine having at least, a voice input activator, a voice receiver, an output signal connected to a communications medium, and an output receiving station remote from the machine, including the steps of:
   energizing the input activator;
   speaking contemporaneously into the voice receiver;
   receiving the message at the machine;
   converting the message to a transmittable signal;
   automatically connecting and transmitting the transmittable signal to the communications medium upon energizing the input activator;
   receiving the signal at the remote station;
   processing the message received at the remote station; and
   deenergizing the input activator.

2. The method of claim 1 wherein the step of energizing the input activator comprises the step of energizing an engageable contact within a machine control panel.

3. The method of claim 1 wherein the step of transmitting the transmittable signal comprises the step of transmitting the transmittable signal on a commercial telephone line.

4. The method of claim 1 wherein the step of transmitting the transmittable signal comprises the step of transmitting the transmittable signal on a dedicated transmission line.

5. The method of claim 1 wherein the step of speaking into the voice receiver comprises the step of speaking into a microphone in a machine control panel.

6. The method of claim 1 wherein the step of energizing the input activator comprises the step of speaking into the voice receiver.

7. The method of claim 1 including the step of recording the message received at the remote station into a voice recorder for later processing.

8. A method of receiving and processing a message in the form of verbal input from a user of a printing machine having at least, a voice input activator, a voice receiver, an output signal connected to a communications medium, and an output receiving station remote from the machine, including the steps of:
   energizing the input activator;
   speaking into the voice receiver;
   receiving the message at the machine;
   converting the message to a transmittable signal;
   automatically connecting and transmitting the transmittable signal to the communications medium upon energizing the input activator;
   receiving the signal at the remote station;
   processing the message received at the remote station;
   deenergizing the input activator; and
   processing manually the verbal input received at the remote station.

9. A method of receiving and processing verbal input from a user coincidental with monitoring the status conditions of a printing machine in a printing system having a host computer, with the printing machine having at least a controller, a calculator, a voice input activator, a voice receiver, and an output receiving station remote from the printing machine, the calculator monitoring predetermined status conditions of the printing machine, including the steps of:
   energizing the input activator;
   speaking into the voice receiver;
   monitoring with the calculator the status conditions of the machine;
   receiving the verbal input and the status conditions of the machine at the machine;
   converting the verbal input and the status conditions of the machine to a transmittable signal;
   automatically connecting and transmitting the transmittable signal to the communications medium upon energizing the input activator; and
   receiving the signal at the remote station;
   processing the information received at the remote station; and
   deenergizing the input activator.

10. The method of claim 9 wherein the step of energizing the input activator comprises the step of energizing an engageable contact within a machine control panel.

11. The method of claim 9 wherein the step of transmitting the transmittable signal comprises the step of transmitting the transmittable signal on a commercial telephone line.

12. The method of claim 9 wherein the step of transmitting the transmittable signal comprises the step of transmitting the transmittable signal on a dedicated transmission line.

13. The method of claim 9 wherein the step of energizing the input activator comprises the step of speaking into the voice receiver.

14. The method of claim 9 including the step of adjusting selected operating components of said machine remotely from said host computer.

15. A printing system of the type having a printing machine, with a plurality of processing stations, a host computer located remotely from the printing machine, and a receiving station, wherein the improvement comprises:
   means for detecting the status of one of the processing stations of the printing machine and transmitting a status signal indicative thereof; and
   an operator actuatable member, associated with the printing machine for transmitting voice information relating to the status of the printing machine to the receiving station in conjunction with said detecting means transmitting the status signal to the host computer.

16. A printing system according to claim 15, wherein said operator actuatable member comprises:
   an input activator associated with the printing machine and operator actuatable;
   a voice receiver energized by said input activator to generate the voice signal; and
   means for transmitting the voice signal from said voice receiver to the receiving station.

17. The printing machine of claim 16 wherein the input activator comprises an engageable contact mounted on the printing machine.

18. The printing machine of claim 16 wherein said transmitting means comprises a telephone line.

19. The printing machine of claim 16 wherein said transmitting means comprises a dedicated transmission line.

20. The printing machine of claim 16 wherein said voice receiver comprises a microphone mounted on the printing machine.

21. The printing machine of claim 16 further comprising a voice recorder for recording the voice signal received at the receiving station.

* * * * *